UNITED STATES PATENT OFFICE.

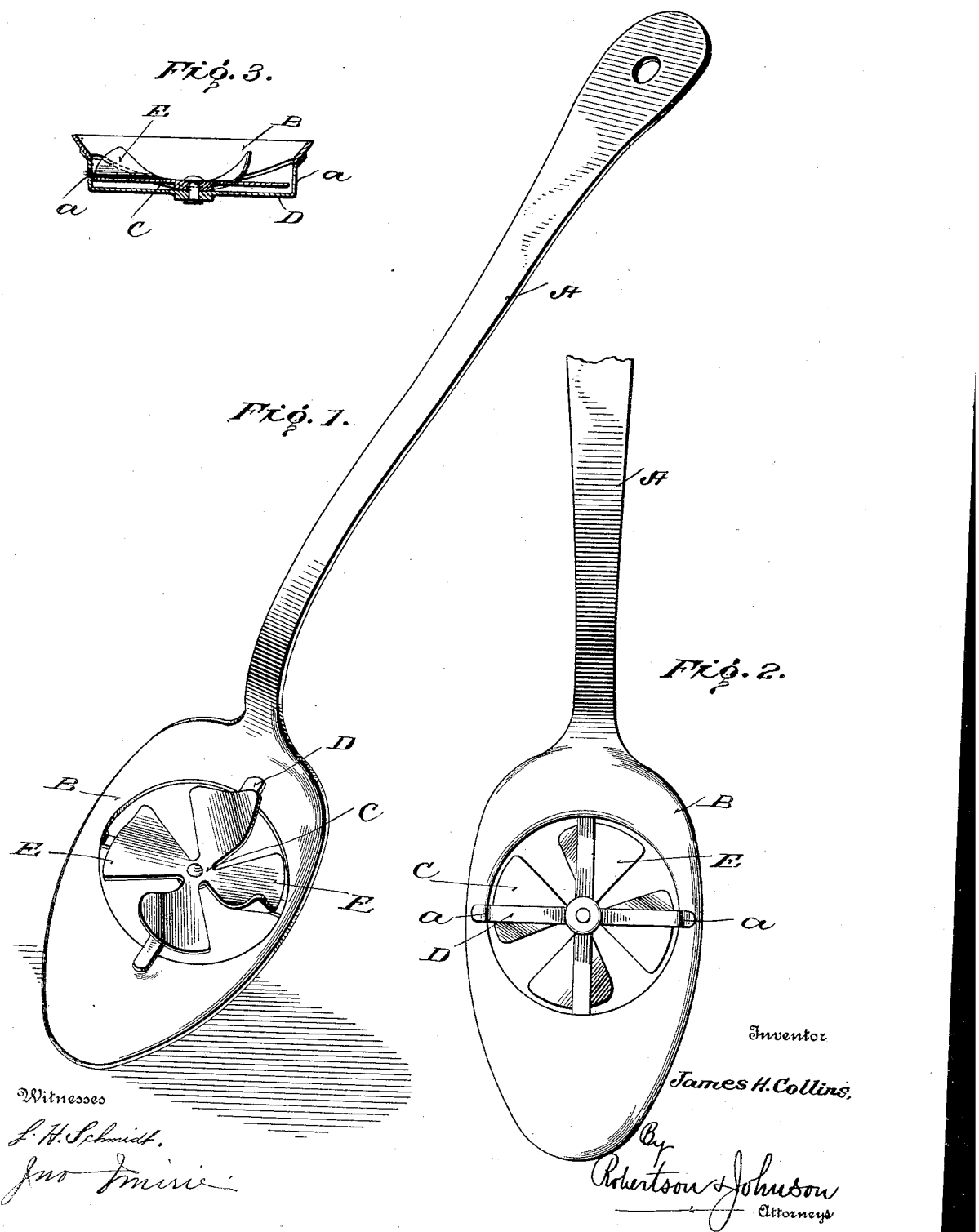

JAMES H. COLLINS, OF HARRISBURG, PENNSYLVANIA.

CULINARY UTENSIL.

No. 929,917.  Specification of Letters Patent.  Patented Aug. 3, 1909.

Application filed July 30, 1907. Serial No. 386,306.

*To all whom it may concern:*

Be it known that I, JAMES H. COLLINS, of Harrisburg, in the county of Dauphin and State of Pennsylvania, have invented certain new and useful Improvements in Culinary Utensils, of which the following is a specification.

My invention relates to a culinary utensil for use in beating eggs, etc. It is a self-contained implement adapted to be held in the hand and given bodily movement, being in this respect distinguished from machines for a like purpose and from parts of machines such as churn dashers which are not self-contained, but require another specially adapted element with which they coöperate.

The beater as illustrated consists of a spoon in the bowl of which is pivoted an agitator wheel. I do not, however, limit myself to the use of a spoon in all cases although the spoon is preferable to any other form of implement, but may employ a beater body of a different shape from the bowl of a spoon.

For a detailed description of the implement reference should be had to the drawings in which—

Figure 1 is a perspective view; Fig. 2 is a bottom plan view; and Fig. 3 is a transverse section through the axis of the agitator wheel.

The implement comprises a handle A and a beater body B which as shown is concave and forms a spoon bowl. The beater body forms an extension of the handle in a plane which is substantially that of the handle. This part B is called a beater body since it is not merely a support but acts directly in the operation of beating.

C is an agitator wheel formed like a propeller and pivoted on the beater body. As shown the beater body is provided with a circular hole of slightly larger diameter than that of the agitator wheel, the said wheel being pivoted at the common center of the hole and wheel. While a substantially circular hole is preferable, I do not wish to be understood as limiting myself in all cases to a hole of that shape.

A spider D is illustrated as the means for supporting the agitator wheel and this spider or other suitable support may either be integral with the beater body or may be attached thereto in any suitable manner. The longitudinal members of the spider are shown as flat while the transverse members are bent so that they have vertical portions *a* adjacent to the spoon bowl. This arrangement gives room for the wheel.

It will be understood that the agitator wheel is freely pivoted on the beater body. It has been stated that this wheel is formed like a propeller. In the embodiment shown the agitator wheel is provided with vanes E, each of which is in part in substantially the plane of the hole through the beater body and in part is curved away from the hole. This construction is such that when the implement is moved rapidly in the operation of beating, the liquid acts upon the vanes to cause the wheel to rotate and thus assist in the beating operation.

The construction in which the agitator wheel rotates freely in the spoon bowl is an especially advantageous one though not, as already observed, the only possible embodiment of this invention in its broad sense. Indeed it will be clear that while an agitator wheel is especially effective, an agitator of some other form might be employed.

The simplicity and strength of this implement will be evident and should commend it.

What I claim as new is:

1. A beater consisting of a self-contained implement adapted to be held in the hand and given bodily movement in the act of beating, provided with a handle, a beater body forming an extension thereof in a plane which is substantially that of the handle, and an agitator freely movable with respect to the beater body.

2. A beater consisting of a self-contained implement adapted to be held in the hand and given bodily movement in the act of beating, provided with a handle, a beater body forming an extension thereof in a plane which is substantially that of the handle, and an agitator freely pivoted to said beater body.

3. A beater consisting of a self-contained implement adapted to be held in the hand and given bodily movement in the act of beating, provided with a handle, a beater body forming an extension thereof in a plane which is substantially that of the handle, and an agitator wheel freely pivoted to said beater body.

4. A beater consisting of a self-contained implement adapted to be held in the hand and given bodily movement in the act of beating, provided with a handle, a beater body forming an extension thereof in a plane which is substantially that of the handle, and having a circular hole therethrough and an agitator wheel formed like a propeller and pivoted at the common center of said hole and wheel.

5. A beater consisting of a spoon provided with an agitator movable with respect to the bowl of the spoon.

6. A beater consisting of a spoon provided with an agitator wheel mounted for rotation in the bowl of the spoon.

7. A beater consisting of a spoon having a hole through its bowl and provided with an agitator wheel mounted for rotation adjacent said hole.

8. A beater consisting of a spoon having a hole through its bowl and provided with an agitator wheel formed like a propeller and mounted for rotation adjacent said hole.

9. A beater consisting of a spoon having a circular hole through its bowl and provided with an agitator wheel of a diameter slightly less than that of the hole and pivoted at the common center of said hole and wheel.

10. A beater consisting of a spoon having a circular hole through its bowl and provided with an agitator wheel of a diameter slightly less than that of the hole and pivoted at the common center of said hole and wheel, said wheel having vanes each of which is in part in substantially the plane of the hole, and in part is curved away from said hole.

Signed by me at Harrisburg Pennsylvania this 27th day of July 1907.

JAMES H. COLLINS.

Witnesses:
    VICTOR M. HEAVER,
    R. E. STEEVER.